July 9, 1935.  J. F. DUBY  2,007,565
VEHICLE TESTING APPARATUS
Filed Feb. 26, 1930  2 Sheets-Sheet 1
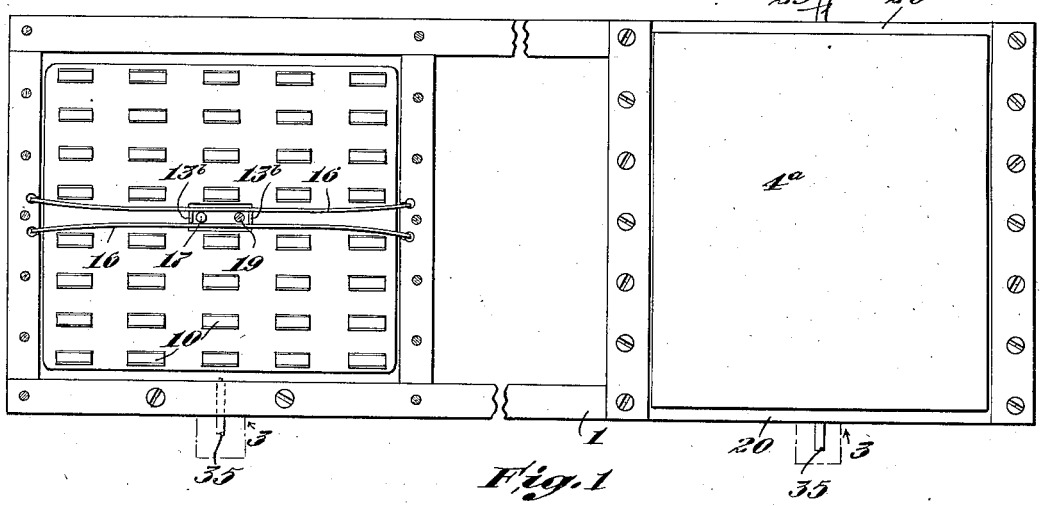
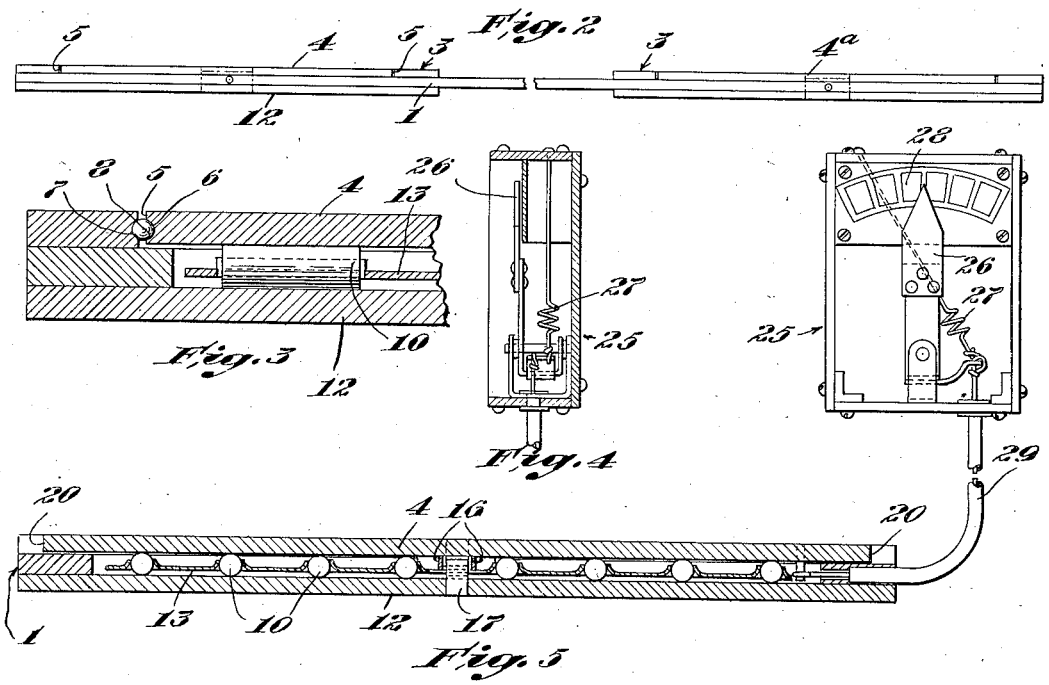

July 9, 1935.  J. F. DUBY  2,007,565
VEHICLE TESTING APPARATUS
Filed Feb. 26, 1930  2 Sheets-Sheet 2
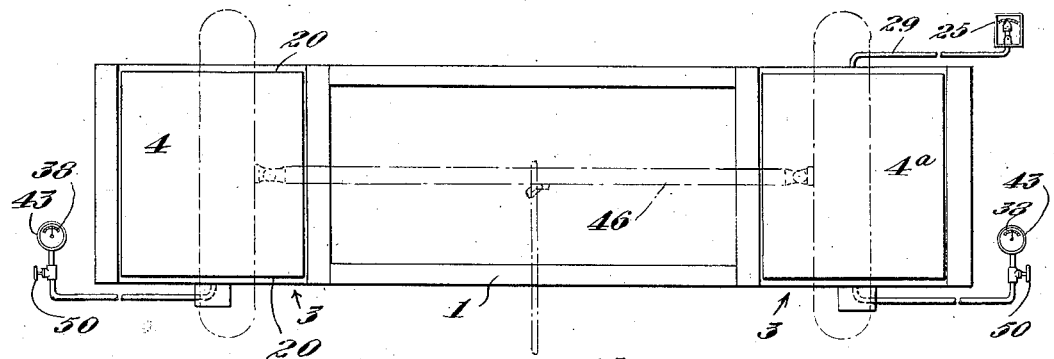
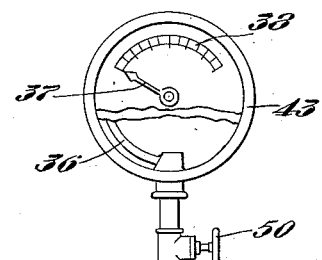
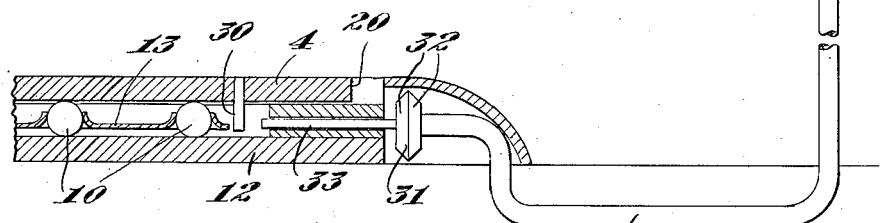
Fig. 7
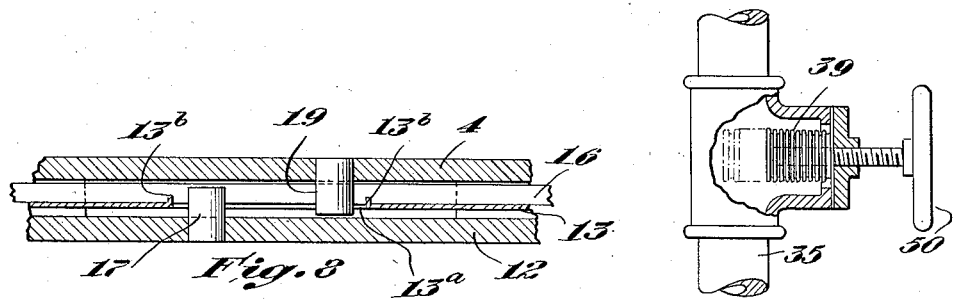
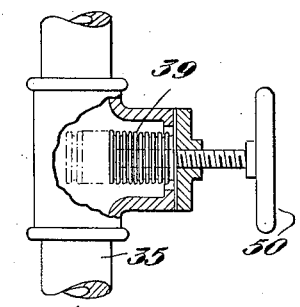
Fig. 8  Fig. 9
Inventor
John F. Duby
by Roberts, Cushman & Woodberry
Attorneys Patented July 9, 1935

2,007,565

UNITED STATES PATENT OFFICE 2,007,565

VEHICLE TESTING APPARATUS

John F. Duby, Boston, Mass.

Application February 26, 1930, Serial No. 431,410

3 Claims. (Cl. 33—203)

This invention relates to a method of testing the misalignment of vehicle wheels to afford ready quantitative determination of such misalignment and to testing apparatus for this purpose and also for testing the brakes of vehicles.

The present invention involves the employment of a pair of movable wheel engageable elements which are preferably arranged to move in substantially parallel paths, and are normally retained in positions intermediate the ends of these paths. For this purpose, for example relatively light springs may be employed so that the elements may readily move out of their normal positions in response to distortion in the side wall of vehicle tires. Preferably, suitable means is arranged adjoining the ends of paths of movement of the elements in one direction which is adapted to indicate the relative forces tending to urge the elements toward the ends of their paths, thereby affording means for testing vehicle brakes and determining the equalization of the same.

When the wheels of a pneumatic tired vehicle are misaligned, i. e., out of substantial parallelism with each other, there is a tendency for the tire wall to become distorted in response to the lateral pressure imposed thereon by the supporting surface as a result of the misalignment. Accordingly, if one tire remains upon a fixed surface and the other is driven upon an element which is readily movable in a lateral direction, the movement of the element in response to the tendency of the distorted tire wall to return to its normal shape affords an indication of the misalignment of the wheels. However, such means when employed by itself, does not afford an accurate indication of the amount of misalignment, a factor which it is very desirable to ascertain, in order to permit the more facile adjustment of the wheels to bring them into alignment. Obviously, when the lateral distortion of the tire wall has built up to a certain point, lateral slippage of the tread in relation to the supporting surface will occur so that this lateral distortion may ordinarily build up to a rather definitely limited maximum despite the amount of wheel misalignment; accordingly, when one of the wheels is driven upon a movable platform in the manner indicated above, the distortion which causes the lateral movement of the wheel engaging element or platform may have accrued in driving only a few feet since lateral slippage took place or may have occurred in driving a comparatively long distance. I have discovered however that it is possible to employ a laterally movable element or platform to afford a quantitative indication of the misalignment of wheels by removing the lateral distortion of the tire wall before the wheel passes onto the movable element, thus, for example, permitting the latter to be displaced for a distance which corresponds to the amount of distortion of the tire wall that has accrued in a limited distance. This distance may be so determined that even with the maximum wheel misalignment that ordinarily occurs, the slippage of the tire tread in relation to a fixed supporting surface will not occur between the point where lateral distortion is removed and the point where the accruing lateral distortion is registered, while the distance of wheel movement must be sufficient to permit a definite indication of even a comparatively small misalignment of the wheels. By experiment I have determined that a predetermined distance of the order of from four to five feet is commercially satisfactory for this purpose; this distance also corresponding to the tread dimension of conventional vehicles.

The present invention therefore preferably involves the employment of a pair of movable wheel engaging elements or platforms which are spaced from each other at a determined distance which may be of the order of the tread dimension of a conventional vehicle, these platforms being readily movable in parallel paths with resilient means or the like arranged normally to hold the platforms in positions intermediate the ends of their paths. One wheel of the vehicle may then be driven upon one of these movable elements which is readily displaced in response to lateral distortion of the tire wall so that that distortion is substantially removed. The vehicle is then driven the determined distance to the second wheel engaging element, which is displaced an amount corresponding to the amount of tire wall distortion that has accrued during the determined distance. A suitable indicator associated with the second movable element will therefore show the direction of wheel misalignment and also afford an approximate quantitative indication of this misalignment.

Not only does apparatus of this character permit the more accurate determination of the amount of wheel misalignment, but it also may be employed to indicate the braking effort imparted by a pair of vehicle wheels. For this purpose, suitable indicating means may be associated with both of the platforms or movable wheel engaging elements to show the relative tractive or braking force imparted thereto by the wheels. As each platform approaches the end of its path, it may actuate a pressure-responsive indicator to show the displacing force imparted thereto by the corresponding wheel, the brakes having been set and towing of the vehicle having been initiated to cause this force to correspond to the braking effect attainable upon that wheel. For example, the two front or two rear wheels of the vehicle may be driven upon the respective platforms or movable elements, the vehicle is then connected to any suitable towing means, the brakes are actuated, and the tow line is drawn taut to cause the brakes to slip. Thus, the force responsive indicators will afford an indication of the relative braking effects which are supplied to the two wheels in engagement with the platforms.

In the accompanying drawings,

Fig. 1 is a broken top view of the improved testing apparatus, one of the movable wheel displaceable elements being removed;

Fig. 2 is a side elevation of the apparatus, a central portion of the same being removed;

Fig. 3 is a sectional detail of a part of the apparatus;

Fig. 4 is a vertical section through an indicator to show wheel misalignment;

Fig. 5 is a central sectional view of one of the platform assemblies and adjoining portions of the frame, and showing the misalignment indicator in front elevation;

Fig. 6 is a top view of the testing apparatus, showing in dot and dash lines the arrangement of the wheels and axles in relation to the same when brakes are to be tested and also diagrammatically indicating the relation of typical towing means thereto;

Fig. 7 is a sectional detail of a portion of one platform assembly, showing the relation of the same to one of the indicators which is employed for brake testing;

Fig. 8 is a vertical sectional detail of the central portion of a platform and related parts; and Fig. 9 is a sectional detail of an adjusting means which forms a part of one of the indicating systems.

In the accompanying drawings, the numeral 1 designates a supporting frame which may be conveniently disposed upon or embedded in a suitable supporting surface such as a concrete floor. The frame 1 may be conveniently provided with two spaced rectangular end portions 3 over each of which a movable platform or wheel engaging element is disposed. Since these elements in general may be similar, a detailed explanation of the arrangement of one of the same will serve to afford an understanding of the arrangement of both platforms in relation to the frame 1 and related parts. The platform 4 may be provided with ends 5 (Fig. 3), which are disposed in close parallelism to the adjoining portions of the frame, suitable guide means being provided to permit the ready movement of these edges of the platform in relation to the frame. Thus, for example, grooves 6 and 7 may be provided in the platform and the adjoining parts of the frame and antifriction balls 8 disposed therein.

Preferably the platform is mounted upon a series of anti-friction elements 10 such as rollers which rest upon a bed plate 12 forming the bottom of this portion of the frame, and a cage plate 13 is arranged properly to position the rollers 12. Leaf springs 16 may be arranged with their ends held in diverging relation to each other by the frame 1. A pin 17 extends upwardly from the bed 12 through an opening 13ᵃ in plate 13 with its end between the intermediate parts of these springs while a second pin 19 depending from the platform 4 engages adjoining portions of the springs (Fig. 8). The lower edges of springs 16 preferably are disposed adjoining the plate 13 and are held in spaced relation by struck-up nubs 13ᵇ integral with this plate at the ends of its central opening 13ᵃ. Preferably the springs and pins 17 and 19 are so arranged that they normally serve to position the platform with its sides 20 spaced from the adjoining edges of the frame 1 (Fig. 6).

The platform 4ᵃ may be similar to the platform 4, being disposed in the other end of frame 1. Preferably one of these platforms, such as the platform 4ᵃ, is connected to a suitable indicator 25 which is adapted to register the amount of lateral displacement of the corresponding platform. For this purpose, a swinging pointer 26 may be retained by a spring 27 in a normal central position in relation to a graduated sector 28. Preferably, a Bowden wire 29 is arranged between the swinging pointer 26 and the platform so that the displacement of the latter toward either side of the frame 1 results in a corresponding movement of the pointer 26 in relation to the graduated sector.

Apparatus of the character described above is adapted to permit the ready ascertainment of the direction and amount of wheel misalignment in accordance with the improved method which forms one aspect of the present invention. When the apparatus is employed for this purpose, one of the wheels of the vehicle may be driven upon the platform 4 in the direction of the platform 4ᵃ so that any accrued lateral distortion of the tire wall will be removed, as the platform 4 is readily displaced in response to the same. The vehicle is then driven in a substantially straight line so that the same wheel then engages the platform 4ᵃ which will be displaced laterally in response to the distortion of the tire wall which has built up between the two platforms. Accordingly, the amount of displacement of the platform 4ᵃ and the corresponding movement of the pointer 26 affords an approximate indication of the amount of wheel misalignment, which is exceedingly desirable in permitting the ready correction of this fault.

Not only is apparatus of this character readily adapted to afford an indication of wheel misalignment but it is also suitable for testing brakes and particularly permits ready determination of the lack of equalization of the brakes for two wheels which are mounted upon the same axle. In order to permit this desirable result, I preferably arrange suitable indicating means to register in response to the force tending to move or displace the platforms as each of the same approaches one end of its path. For this purpose, for example, a suitable pin 30 may be carried at one side of the platform 4 and a corresponding pin may be disposed upon the platform 4ᵃ. A suitable pressure responsive member may be disposed adjoining each pin 30, for example, the chamber 31 formed by a pair of oppositely dished flexible diaphragm elements 32 may be disposed adjoining each nub 30, a suitable abutment member 33 being carried by each of these chambers and having an end disposed in the path of a pin 30.

Preferably each of the chambers 31 is connected by a tube 35 to a suitable fluid pressure responsive indicator 43 which may be of conventional form, and which, for example, may comprise a conventional Bourdon tube 36 associated with a pointer 37 and a graduated dial 38. If desired, a suitable adjustable expansible-contractible member 39 may be disposed in a lateral extension of the tube 35 and controlled by screw-threaded element 50 to permit an adjustment in the volume of the fluid containing system including duct 35, tube 36 and chamber 31 so that inequalities in the pressure responsive systems may be removed by adjustment, and so that adjustments may be made to compensate for changes in pressure or the like. It is, of course, evident that the chambers 31 and tubes 35 contain a suitable fluid such as oil and that the movement of each pin 30 meets substantial opposition, as it engages the corresponding abutment 33; the slight movement of the latter, however, causes a change in that shape of the Bourdon tube 36 connected thereto, and thus affords an indication of the corresponding force tending to displace the platform.

In the employment of apparatus of this character for testing brakes, it is evident that two wheels of a vehicle as for example, the front or rear wheels of the same may be brought into simultaneous engagement with the platforms 4 and 4a, as shown in dot and dash lines in Fig. 6. A suitable manually operated reel 42 may carry a tow line 45 which is connected to the axle 46 of the vehicle, the brakes of the vehicle being actuated so that there is a tendency for the wheels engaging platforms 4 and 4a to oppose rotation as the tow line is drawn taut. Thus, pins 30 are brought into engagement with the corresponding abutment members and the indicators 43 are actuated in response to the braking forces. The application of these forces may be increased by added tension upon the tow line until one of the brakes starts slipping, thus indicating a lack of equalization of the brakes which is readily ascertainable from the corresponding indicators.

While the illustrated and preferred embodiment of my invention involves the provision of a stationary supporting surface upon which limited tire distortion may build up before the wheel reaches the movable element that is effective in indicating the amount of misalignment, it is evident that the wheel may engage this movable element during part or substantially all of its movement through the determined distance from the point where wall distortion is removed to the point where the reading of misalignment is made, and that under these conditons the lateral displacement of the movable element will gradually build up as the wheel passes over the same. If desired, lateral distortion may be removed by driving each of the wheels carried by an axle into engagement with a separate movable element, or the wheels may each be engaged with separate movable elements to register the amount of misalignment; the readings of the indicators associated with each of the elements then being added to show the total amount of misalignment. In other words, the present invention provides a method of determining wheel misalignment which first involves the substantial removal of tire distortion from both wheels upon an axle, then the driving of the wheels a determined distance to a point where one or both engages an element or elements to register the amount of distortion that has built up in the determined distance.

From the foregoing it will be evident that the present invention affords a method of quantitatively determining wheel misalignment which is simple and gives substantially accurate indications of the amount of wheel misalignment in addition to an indication of the mere direction of the same, thus facilitating the subsequent adjustment of the wheels in relation to each other, and further that this invention affords apparatus which is adapted not only to permit the accurate testing of wheel misalignment in this manner, but which also may permit the ready testing of brakes. Thus, this invention affords testing apparatus which is suitable for both these purposes and which need not have a cost substantially greater than is necessary for apparatus suitable for only one of these purposes.

I claim:

1. Apparatus for quantitatively determining vehicle wheel misalignment, which comprises a pair of aligned units each including a readily movable supporting surface which is laterally movable substantially to remove any accrued lateral distortion of the tire wall, a fixed surface of a determined distance of the order of the tread dimension of the vehicle between said units, and means connected to one of said units for measuring the displacement of its surface to ascertain the amount of misalignment.

2. Testing apparatus of the character described comprising a pair of laterally movable wheel engageable elements, means opposing lateral movement of the elements but permitting such movement, said elements being disposed in substantial alignment with each other in a direction at right angles to their paths of lateral movement, there being a fixed supporting surface between the elements upon which surface lateral distortion of the tire wall may be built up, and an indicator to show the amount of displacement of one of said elements.

3. Apparatus for quantitatively determining wheel misalignment, comprising a pair of laterally movable wheel engageable elements, said elements being spaced and disposed substantially in alignment with each other in a direction at right angles to their paths of lateral movement, said elements being spaced at a distance which is less than that in which lateral slippage of the tread will occur in response to the lateral distortion of the tire wall resulting from wheel misalignment of ordinary extent, and an indicator connected to one of said elements to show the lateral displacement of that element resulting from the distortion of the tire wall which accrues after the previously accrued distortion has been removed by the lateral displacement of the other element and the tire has been rolled over a fixed supporting surface between the elements onto the element connected to the indicator.

JOHN F. DUBY.